Oct. 14, 1969

T. E. ORD 3,472,404

MATERIAL HANDLING DEVICE

Filed Sept. 19, 1966

INVENTOR.
THOMAS E. ORD
BY
*Sheridan and Ross*

ATTORNEYS

INVENTOR.
THOMAS E. ORD
BY
*Sheridan and Ross*
ATTORNEYS

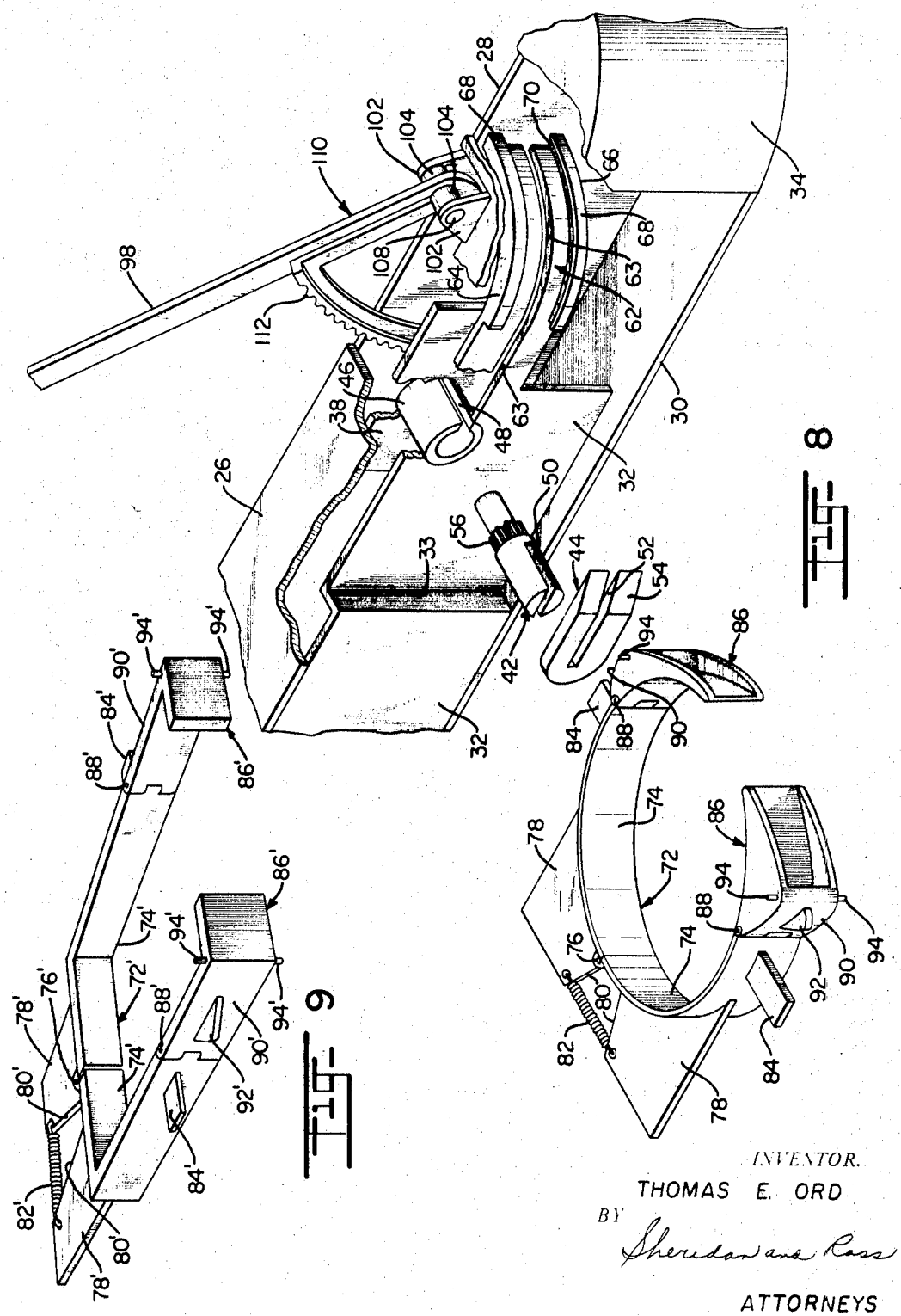

United States Patent Office 3,472,404
Patented Oct. 14, 1969

3,472,404
MATERIAL HANDLING DEVICE
Thomas E. Ord, 4210 Cook St., Denver, Colo. 80216
Filed Sept. 19, 1966, Ser. No. 580,373
Int. Cl. B60b 1/12; B66f 9/18; B65b 69/00
U.S. Cl. 214—313                                     29 Claims

ABSTRACT OF THE DISCLOSURE

An exclusively mechanically operated barrel transporting and dumping device essentially for use with a fork lift truck comprising two support arms to which the arms of the fork lift may be removably engaged, the support arms being provided with trackways along their internal sides, a hinged, semi-circular barrel gripping carrier traveling in said trackways having drum shoes hinged to its free ends for gripping a barrel, cooperative camming means between the trackways and drum shoes operative to open and close the drum shoes as the carrier moves forward and backward, respectively, along the trackways, and barrel dumping means including a rotatable shaft at the rear of the trackways adapted to engage the carrier means.

---

This invention relates to a material handling apparatus; more particularly, it relates to a material handling apparatus for use in conjunction with a vehicle, such as a forklift truck, for transporting and emptying containers.

It is well known that it is a widespread practice in industry to remove the heads of oil drums and use them for receptacles for various materials. Other type drums or containers are also used as receptacles. The practice is to dump the drums or other containers into large receiving units and reuse the drums indefinitely. In view of the large number of containers in use in this manner, the manner in which these heavily loaded containers are transported and dumped creates a serious problem as respects safety, time and labor involved.

Mechanized devices for transporting drums to a dumping area and dumping them are available. However, the presently available devices are extremely complicated and expensive and installation is time-consuming and complicated. Their complication and consequent tendency to break down creates a repair problem. So far as is known, there are no entirely satisfactory devices for use in combination with forklift trucks for transporting and dumping containers. While oil drums being used as receptacles are used to illustrate the operation of the apparatus of this invention, the material handling apparatus of the invention is not limited to use with oil drums as it can be used with other types of receptacles.

Practically all industrial establishments are provided with forklift trucks. Accordingly, it would be advantageous to have available supporting and dumping equipment constructed to be used with forklift trucks for the transportation and dumping of containers.

The major problem associated with the use of forklift trucks to transport and dump containers is the lack of a suitable supporting and dumping device to be attached to the forklift truck which is operative to securely support the drum or other container while it is being transported to the dumping area and then dump it at the dumping area. One solution is the use of a band on each barrel having supporting lugs cooperating with lifting and dumping means attached to the forks of the truck for supporting the barrel and dumping it at the dumping area. This expedient is not entirely satisfactory in that the band carrying the lifting or supporting lugs must be removed from each barrel after it has been dumped and attached to another barrel to be dumped before the latter can be lifted and transported to the dumping area. This is time-consuming and requires a substantial amount of labor on the part of the operator of the forklift truck or his assistant in the removal of the lifting band from one barrel and attaching it to another barrel. It would be desirable if a supporting and dumping or inverter means could be provided for attachment to a forklift truck which would securely support a barrel without a lifting band for transport of the barrel to the dumping area and then effectively dump the barrel.

Another problem encountered in the use of a forklift truck in conjunction with a mechanism for supporting and dumping the barrel is the problem of actuating the inverter to dump the barrel at the dumping area without the necessity for expensive and complicated control devices. It would be advantageous to have available a simple mechanical means for actuating the dumping or inverter mechanism supported by the forklift truck to effectively dump a barrel or other container at the dumping area.

Accordingly, it is an object of this invention to provide a material handling apparatus for use in conjunction with an industrial truck, such as, a forklift truck, for supporting and dumping a barrel or other container.

It is another object of this invention to provide a supporting and dumping mechanism for use in conjunction with industrial trucks which is operative to support and dump a barrel or other container without the use of bands or other supporting mechanism attached to the barrel.

It is another object of this invention to provide a combined forklift truck and supporting and dumping apparatus for supporting and dumping barrels wherein the dumping action of the inverter mechanism for dumping the barrels can be actuated by simple mechanical means.

It is another object of this invention to provide a material handling apparatus of entirely mechanical structure which does not require any hydraulic or electrical equipment for its operation.

It is another object of this invention to provide a material handling apparatus adapted to be connected to the forks of a forklift truck which is operative to effectively lift and support a container, transport it to a dumping area, dump the container, and return the container to the upright position and finally set the container down for refilling, the lifting and dumping operations being effected merely by the raising or lowering of the forks of the forklift truck.

It is another object of this invention to provide a novel combination forklift truck and drum handling and inverting apparatus in which dumping is effected merely by raising the forks of the truck.

It is a further object of this invention to provide a container handling and inverting apparatus which is supported on the forks of a forklift truck and in which provision is made for rotating the inverting mechanism to dump the container merely by connecting the free end of a drum inverter actuating connector to a part of the forklift truck which is stationary relative to the fork.

The invention will now be described with reference to the accompanying drawings wherein like or duplicate parts are represented by like numerals and in which:

FIGURE 2 is a perspective view of the material handling apparatus of the invention mounted on the forks of a conventional forklift truck, all of the truck not being shown;

FIGURE 8 is an exploded view of a partial section of the material handling apparatus showing the manner of assembly of the inverter mechanism and the carrier mechanism; and FIGURE 9 is a perspective view of a modification of the carrier mechanism of FIGURE 7 designed for rectangular containers.

Figure 1:
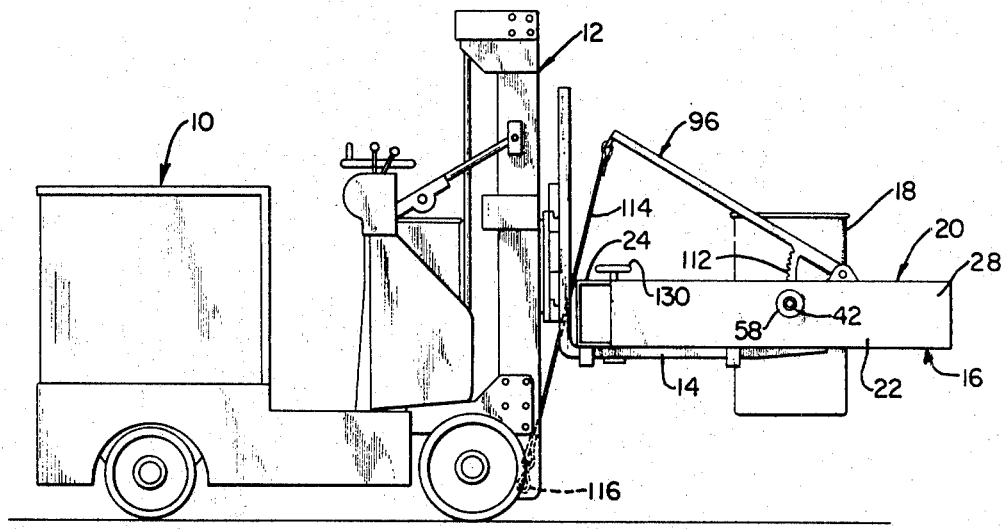
FIGURE 1 is a side elevational view of the material handling apparatus embodying the invention mounted on the forks of a forklift truck.

Referring to the drawings. a conventional forklift truck is shown at 10 provided with a mast 12 upon which is supported a pair of horizontally spaced forks 14, only one being shown in FIGURE 1. Supported on the forks 14 is the supporting and dumping apparatus of the invention indicated generally at 16 and, as shown in FIGURE 1, supporting therein a barrel 18.

The supporting and dumping apparatus 16 supported by the forks 14, and its operation will now be described in detail by reference to FIGURES 2–8. The frame of the supporting and dumping apparatus 16 is represented generally at 20 and is comprised of two parallel carrier support arms 22, and a connecting cross-member represented generally at 24. The support arms 22 are of hollow construction so that space is formed internally thereof for mounting certain mechanism to be described later. The arms 22 are each comprised of top panel 26, outer side panels 28, inner side panels 32, and bottom panel 30. As will be seen from the construction, the arms 22 and back piece 24 form a horseshoe-shaped interior for receiving a barrel 18. Internal outwardly curved plates 34 are mounted near the end of the arms to form a guideway for a barrel into the space between the arms. The inside panels 32 extend forwardly and terminate in elliptical guide surfaces 62 (FIG. 6). These panels are constructed with an outward step 33 leaving a recessed area forward of the step for a purpose to be described later.

Middle support plate 38 for supporting internally mounted mechanism is secured between top and bottom panels 26 and 30, as shown in FIGURE 8, by welding or otherwise.

As the inverter mechanisms mounted in each arm 22 are identical, only one inverter mechanism will be described.

Figure 3:
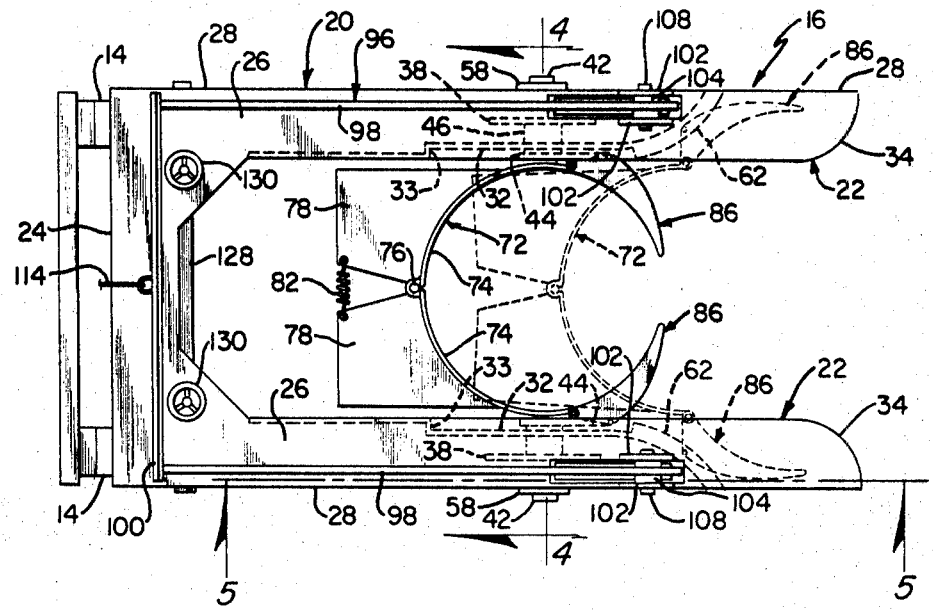
FIGURE 3 is a top plan view of the structure shown in FIGURE 2.
Figure 4:
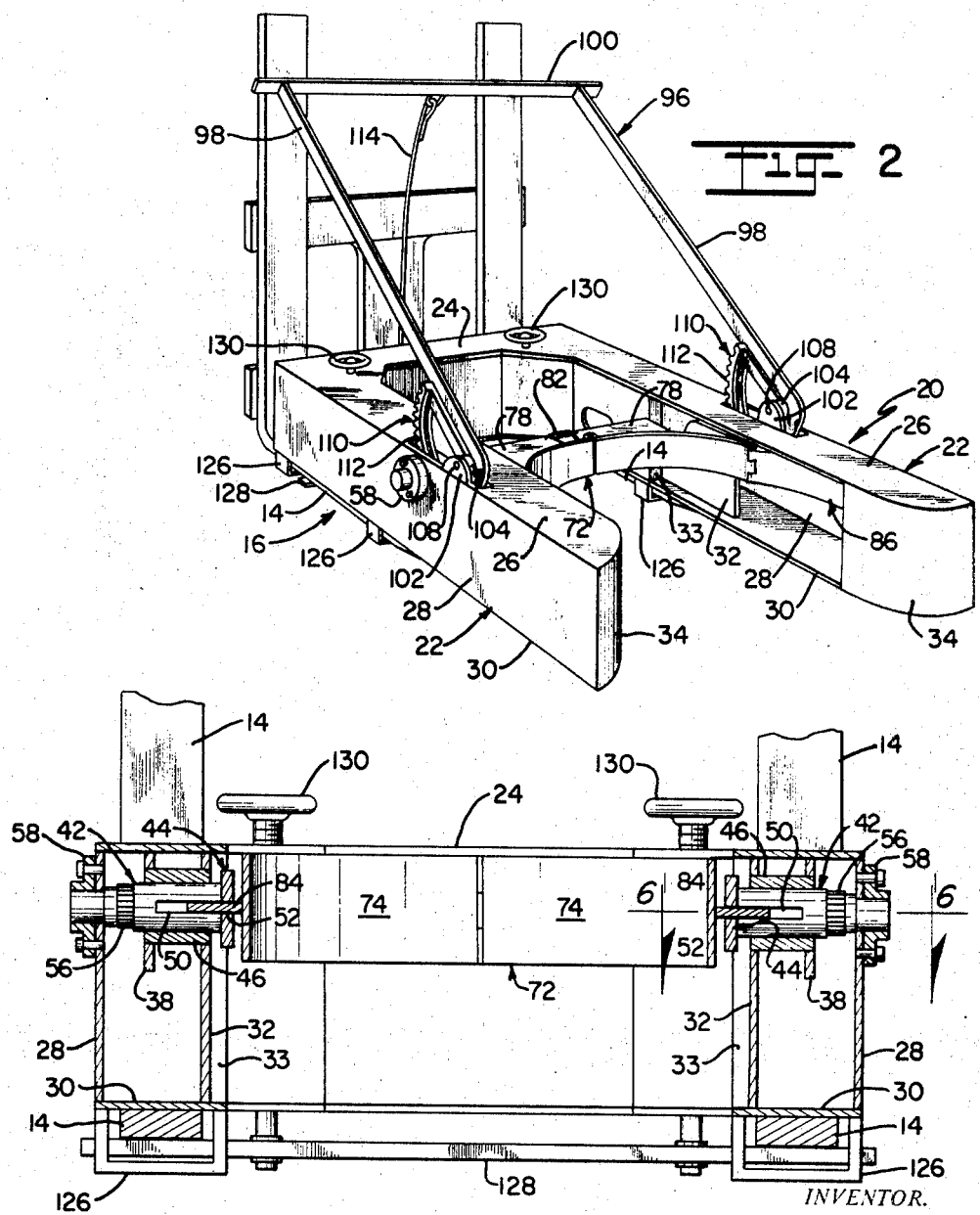
FIGURE 4 is a sectional view taken along the line 4—4 of FIGURE 3.

Referring to FIG. 8, each inverter mechanism of the supporting and dumping apparatus, comprises a cylindrical shaft 42 having integrally attached thereto a slotted tongue 44, and a sleeve bearing 46. The shaft 42 has an axially extending slot 50 therein. The slotted tongue 44 has an axially extending slot 52 therein, and sloping holding or camming surface 54 at its forward end. The sleeve bearing 46 is provided with an axially extending slot 48 therein. The slotted shaft 42 is provided at one end with gear teeth 56 and has a diameter which will permit it to fit inside of sleeve bearing 46 with the gear teeth extending beyond the outer end of the sleeve bearing 46. As shown in FIG. 3, an assembled inverter mechanism is mounted in each support arm 22 between support plate 38 and the inside panel 32 of each support arm 22. The end of the slotted shaft 42 protrudes on through the side plate 28 and is secured in place by a bearing member 58 as shown, or by other suitable means. The sleeve bearing 46 is fixedly mounted in support plate 38 and inside panel 32 so that the shaft 42 with its attached slotted tongue 44 rotates with respect to the sleeve bearing 46, and the slots of the sleeve bearing and the shaft move in and out of register with each other. The stop 33 in panel 32 leaves a space in front of the step permitting the tongue 44 to rotate through 180 degrees.

The elliptically shaped forward guiding surfaces 62 (FIG. 6) are provided with a horizontally extending slot 63. Top and bottom flanges 64 and 66 (FIG. 8) are provided for each of the elliptical guide surfaces 62 extending perpendicularly thereto and each protruding beyond the edge of elliptical guide surface 62 as shown in FIG. 8. The outer edges 68 of flanges 64 and 66 are bent inwardly to form upper and lower guide slots 70 (FIG. 5) on the inner surfaces of flanges 64 and 66.

Figure 7:
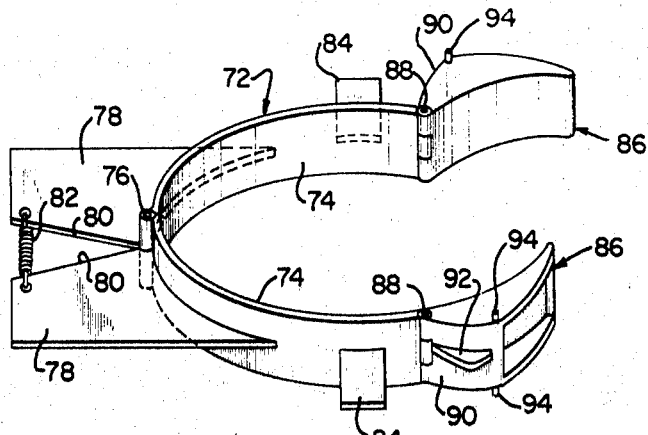
FIGURE 7 is a perspective view of the carrier mechanism for gripping and supporting a barrel.

The carrier mechanism for supporting the barrel as it is being transported and dumped will now be described by reference to FIG. 7. The carrier is represented generally by the numeral 72 and is comprised of semicircular band portions 74 hinged together by piano-type hinge 76 as shown. Flat plates 78 which serve as lever arms are secured to the semicircular band portions as shown. The plates 78 are cut away at their adjacent edges at 80 as shown so that the plates can move together under the action of spring 82 mounted between the ends of their adjacent edges. This arrangement serves to bias the semicircular band portions outwardly.

A horizontally extending flat support lug 84 is welded on the outside surface of each semicircular band portion 74 near its front end as shown, for a purpose to be described later. Drum shoes 86 are attached to the forward end of the semicircular band portions 74 by means of piano-type hinges 88. The drum shoes 86 are hinged to swing outwardly in the same horizontal plane as that in which the semicircular band portions 74 move. The inner surfaces of the drum shoes 86 are arcuately curved to correspond to the curve of the semicircular band portions 74 so that when they are closed to the inward position they form a complete circle with the arcuately curved semicircular band portions 74.

The back side of each drum shoe 86 is angled and formed with a holding or camming surface 90 upon which is mounted guide lugs 92. Guide pins 94 are mounted vertically at the apex of the angle in the back of the drum shoes and extend vertically thereof above and below the edges of the drum shoes.

Figure 5:
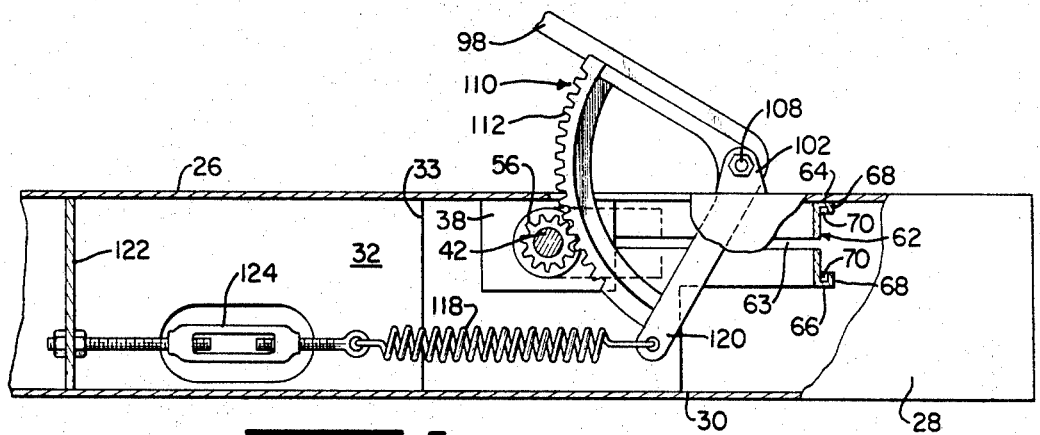
FIGURE 5 is a sectional view taken along the line 5—5 of FIGURE 3.
Figure 6:
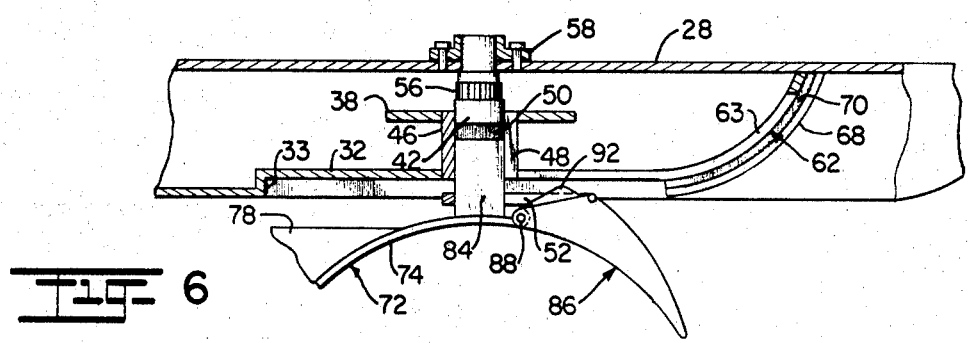
FIGURE 6 is a sectional view taken along the line 6—6 of FIGURE 4.

The guide slots 70 are open at their forward end as shown in FIG. 5. The carrier 72 is mounted between the arms 22 by bringing it through the entrance formed by the forward ends 34 of the arms, and inserting the supporting lugs 84 in the rear entrance of corresponding slots 63. In this initial assembly the drum shoes 86 will be manually rotated outwardly to engage guide pins 94 into their corresponding slots 70 and guide lugs 92 into their corresponding guide slots 63 as the carrier 72 is moved forwardly. Further manual forward movement of carrier 72 will cause the drum shoes to follow the guide surfaces 62 and enter their corresponding recesses provided in the forward section of support arms 22 between the guide surfaces 62 and the curved plates 34. In this position, the carrier will be supported in its forward location. In this forward location of the carrier the guide pins 94 riding in the front ends of guide slots 70 will hold the drum shoes 86 in an open extended position for receiving a barrel into the area between the semicircular band portions 74. In the forwardmost position of the drum shoes 86 they will be retracted into the recesses in the support arm 22 behind the tips 34 and forward of the elliptical guide surfaces 62. The inverter mechanism will be oriented so that the slots 48, 50, 52 and 63 are all coplanar. This position of slots 50 and 52 in shaft 42 and tongue 44, respectively, is determined by the position of lever 96 as will be explained later.

A lever 96 comprised of arms 98 (FIG. 2) and crossbar 100 is hingedly mounted in the trunnions 102 on the top of support arms 22 by means of spacing washers 104 and hinge pins 108. Each of the lever arms is provided with a gear sector 110 extending through a cut out portion in top plates 26 and having at its outer edge gear teeth 112 which mesh with gear teeth 56 of the slotted shaft 42 (FIG. 4) for the purpose of rotating shaft 42. The crossbar 100 is connected by chain 114 or other flexible type connector to a stationary portion of the truck 10 as by means of an eyelet 116 (FIG. 1).

A biasing spring 118 is mounted in each arm 22 between bell crank arm 120 of the gear sector 110 and the front plate 122 of connector cross member 24. A conventional turnbuckle 124 for controlling the tension of spring 118 is connected between spring 118 and front plate 122. The spring 118 biases the actuating lever 96 to its upper and forward position and, correspondingly, the inverter mechanism to its open position in which the slots 48, 50 and 52 are in registry and coplanar with slot 63 to permit entry of the supporting lugs 84 into slots 50 of shaft 42 as the barrel is being secured to the transporting and dumping mechanism for transport to a dumping area.

The supporting and dumping apparatus 16 is provided with fore and aft loops or stirrups 126 (FIG. 4) for receiving the forks 14 of the forklift truck. The fork arms can be secured to the supporting and dumping apparatus 16 by means of horizontally mounted clamping bar 128 which can be moved into and out of clamping relationship with the forks 14 by means of threaded shafts and hand wheels 30 mounted in the top of connecting cross member 24 and attached to clamping bar 128.

The operation of the combined lift truck and supporting and dumping mechanism will now be described. To mount the supporting and dumping device 16 to a forklift truck, the operator approaches the device resting on the floor with the forks lowered to near floor level. By properly steering the truck the operator inserts the fork arms 14 through the loops and stirrups 126. The operator then adjusts the hand wheels 130 to tighten the clamping bar against the forks thereby securely fastening the device to the lift truck. The operator next attaches the chain 114 of the actuating lever 96 to the eyelet 116 on the truck, allowing enough slack in the chain so that inverter actuating lever 96 will not be actuated until the forks have reached a predetermined height. The operator then steers the truck with the lifting and dumping device attached towards the drum which is to be emptied.

When the forklift truck carrying the supporting and dumping apparatus on the forks is moved forwardly with the carrier 72 in the forward position for picking up a barrel, the forward surfaces of the semicircular band portions 74 will contact the outer surface of the barrel. As there is only a slight amount of friction between interconnecting parts of the carrier 72 and the inverter mechanism and associated apparatus, contact of the carrier mechanism with the loaded barrel will cause the carrier to move rearwardly with the guide pins 94 traveling rearwardly in their corresponding guide slots 70 and the support lugs 84 and the guide lugs 92 moving rearwardly in the slots 63 (FIG. 8). When the support lugs 84 reach their rearward position at the back of slots 50 and 52, the travel of the guide pins 94 rearwardly along the eliptically-shaped guide slots 70 will force drum shoes 86 securely around the front surface of the barrel so that the barrel is surrounded below a rolling hoop by semicircular band portions 74 and drum shoes 86 of the carrier 72. The supporting and dumping apparatus is now in position around the barrel for lifting the barrel. The carrier 72 is next locked in the inverter mechanism so that it and the barrel cannot slide forward out of the slotted shafts 42 as follows: the mast 12 is moved slightly in the rearward direction causing the forward end of the supporting and dumping mechanism 16 to be slightly elevated. In this position the supported barrel, because it is grasped by its upper portion above its center of gravity, will hang perpendicularly. This will cause the shaft 42 to rotate slightly with movement of its slot 50 out of registry with the slot 48 (FIG. 8) of the bearing 46 thereby locking the carrier support lugs 84 within the slots 50 of the shaft 42 preventing their exit therefrom.

The drum shoe guide pins 94 in the reawardmost position of the carrier 72 have traveled rearwardly beyond the rear exit of their corresponding guide slots so that the drum shoes are clear of all guide slots and the elliptical guide surfaces 62 to permit rotation of the carrier 72 for dumping the barrel. The drum shoes 86 are held in the closed position against the barrel when the carrier support lugs 84 have reached the limit of their rearward travel by contact between the holding surfaces 90 on the drum shoes 86 and corresponding angled surfaces 54 on the slotted tongues 52. The fork arms are elevated slightly thus lifting the drum to effect its clearance from the floor and in this position the drum is transported to the dumping area.

When the dumping area is reached the dumping of the barrel is effected merely by raising the forks 14 of the forklift truck. As the crossbar 100 of lever 96 is secured by chain 114 to a fixed portion of the truck 10, raising the forks 14 causes lever 96 to move downwardly and thus rotate the slotted shaft 42 in a forward dumping direction thereby inverting the barrel or other type container. After the barrel is dumped, the tension of spring 118 will rotate lever 96 upwardly as the forks 14 are lowered to return the empty barrel to the transporting position to transport it back to its original position.

When the position at which the barrel is to be deposited has been reached the mast 12 is moved slightly forward to its forward position to unlock the inverter mechanism by rotating shaft 42 and, correspondingly, slotted tongue 44, until slots 48, 50 and 52 are in registery and all coplanar with slot 63.

A slight additional lowering of the forks after the barrel has contacted the floor will cause the drum shoes 86 and the semicircular band portions 74 of the carrier 72 to be lowered beneath the chines or rolling hoop of the barrel. This reduces any friction which would tend to hold the drum shoes in a gripping position around the drum when the lift truck is moved rearwardly. The friction of the bottom of the barrel on the floor surface, and contact of the front of the barrel with adjacent surfaces of the drum shoes causes the carrier to move forward as the lift truck is moved rearwardly. The guide pins 94 once again will engage their corresponding guide slots 70 and as the carrier moves forward the drum shoes will be rotated outwardly by travel of the guide pins in the guide slots 70 into the forward recesses of the carrier support arms. The spreading of the semicircular band portions 74 of the carrier 72 is effected by the outward biasing torque of the torsion spring 82 and by the carrier's forward travel down the angled surfaces of the slotted tongues 44. By the above described actions, the clamping surfaces of the carrier 72 open outwardly thus effecting easy release of the barrel 18 from the supporting and dumping mechanism 16.

FIGURE 9 shows a modification 72' of the carrier mechanism 72 necessary for rectangular baskets, crates, boxes, cartons, etc. In this figure, parts corresponding to those of the carrier mechanism 72 as shown in FIGURE 8 are represented by corresponding numerals with a prime. The carrier mechanism 72' operates in identical manner as that of carrier mechanism 72, with corresponding parts of the two mechanisms performing corresponding functions, the carrier mechanism 72 being designed for curved-shaped containers and that of 72' for rectangular-shaped containers. The carrier mechanism 72' is shown with the drum shoes 86' hinged by hinge pin 88' to rectangular arms 74'; however, the hinges and hinge pins can be eliminated and the drum shoes 86' and arms 74' made integral.

From the above description it is seen that a material handling apparatus has been provided by the invention which can be readily attached and used with a standard forklift truck and other vehicles. The supporting and dumping mechanism of the invention permits transporting and dumping of containers without the use of container bands and other auxiliary apparatus. The invention is of simple mechanical construction and free of hydraulic or electrical controls of any type. It is simple and effective in operation and can be operated by a single operator of a forklift truck.

While the structure and operation of the invention have been described in connection with specific modifications, the invention is by no means limited to these modifications as it includes equivalent modifications and is not limited beyond the scope of the appended claims.

What is claimed is:

1. Apparatus for dumping containers adapted to be positioned on a supporting device comprising: at least one support member; container carrier means carried by said support member adapted to travel longitudinally therealong and to grippingly encircle the outside of said container more than 180°; and dumping means adjacent one end of the path of travel of said carrier means for engagement by said container carrier means including means for rotating the container carrier means to dump the container carried by it.

2. Apparatus of claim 1 in which said container carrier means travels horizontally with respect to said support member.

3. Apparatus of claim 1 including means for locking said container carrier means in said dumping means to permit rotation of the container carrier means.

4. Material handling apparatus comprising: elevatable frame means having horizontally disposed arms for mounting on a support; container carrier means disposed between said arms of said frame means adapted to travel longitudinally between said arms and to grippingly encircle the outside of said container more than 180°; and means including connecting means between said support and said container carrier means for tilting said container carrier means by moving said frame means relative to said support.

5. Material handling apparatus as set forth in claim 4, wherein said container carrier means travels horizontally along said arms of said frame means from front to rear upon coming into contact with a container, and said container carrier means and the container being tiltable only when in a predetermined position along said arms of said frame means.

6. Material handling apparatus comprising: mobile platform means; frame means including at least two arms carried by said mobile platform means; material carrier means supported between the arms of said frame means adapted to move longitudinally of said arms and to grippingly encircle the outside of said material more than 180°, said carrier means embracing material upon being carried by said mobile platform means into engagement with the same; means for elevating said frame means relative to said mobile platform means; and means for tilting said carrier means and the material embraced thereby upon elevating said frame means relative to said mobile platform means.

7. Apparatus for transporting and dumping containers comprising: a lifting device including at least one support member, a sleeve bearing having a longitudinal slot therein mounted in said support member, a pivotable shaft having a slot therein journaled in said sleeve bearing, means for pivoting said shaft in said sleeve bearing to bring said slots into and out of registry, and semi-circular container carrier means having supporting lugs thereon carried by said support member and adapted to travel longitudinally thereof with said lugs moving into and out of said slots in registry.

8. Apparatus as set forth in claim 7, wherein pivotal movement of said pivotable shaft while engaged by and supporting said container carrier means locks the same in said sleeve bearing and prevents longitudinal movement of said container carrier means.

9. Apparatus as set forth in claim 7, wherein said support member is elongated and is substantially horizontally disposed.

10. Apparatus for dumping containers comprising, structural frame means including two spaced-apart elongated and substantially horizontal support members, means connected to said support members for connecting lifting means thereto, a sector gear pivotally connected to at least one of said support members, a slotted sleeve bearing carried by each of said support members, a pivotable slotted shaft in each of said sleeve bearings, and a pinion fixed to at least one of said shafts meshing with said sector gear, and longitudinally movable container carrier means having support lug means supported by said support members therebetween for longitudinal movement into and out of said slots in said shafts when said slots of said shafts and said sleeve bearings are aligned.

11. Apparatus as set forth in claim 10, further comprising means for automatically locking said container carrier lug means into said slots of said shafts by pivoting the same until said slots of said shafts are out of alignment with said slots in said sleeve bearings.

12. In an industrial truck having a vertically movable frame on one end thereof and having two laterally spaced members disposed in substantially the same horizontal plane and each having a longitudinal axis disposed in substantially parallel relation to each other, frame means having longitudinally extending and laterally spaced arm means for being raised and lowered therewith, container carrier means pivotally supported between said arm means and adapted to travel horizontally on substantially coplanar trackways, said carrier means comprising semicircular band portion means, drum shoe means connected to each portion of said semicircular band portion means adapted to swing laterally outwardly to an extended position for permitting admission of a container into contact with said semicircular band portion means when the truck approaches a relatively stationary container, and cam means carried by each of said arm means for camming each of said drum shoe means horizontally inwardly into a container embracing position substantially arcuately coextensive with said semicircular band portion means when said carrier means are urged to a rearward position upon engagement with the container and thereby grasping the container for vertical elevation and transport by the two laterally spaced members and said arm means.

13. In an industrial truck as set forth in claim 12, means for tilting said carrier means for inverting the container and emptying any contents thereof.

14. In an industrial truck as set forth in claim 12, means for automatically tilting said carrier means and correspondingly tilting any container carried thereby when the vertically movable frame and the two laterally spaced members are raised a predetermined distance.

15. In an industrial truck having a vertically movable frame on one end thereof and having two laterally spaced members disposed in substantially the same horizontal plane and each having a longitudinal axis disposed in substantially parallel relation to each other, frame means having longitudinally extending and laterally spaced apart support arm means connected to and carried by the two laterally spaced members for being raised and lowered therewith, cargo carrier means journaled between said support arm means adapted to travel horizontally on substantially coplanar trackways, said carrier means comprising semicircular band portion means, drum shoe means connected to each band portion of said semicircular band portion means adapted to swing laterally outwardly to an extended position for permitting admission of a cargo into contact with said semicircular band portion means when the truck approaches a relatively stationary cargo, and means carried by each of said support arm means for urging each of said drum shoe means horizontally inwardly into a cargo embracing position substantially annularly coextensive with said semicircular band portion means when said carrier means are urged to a rearward position upon engaging of the cargo and thus grasping the cargo for transport and vertical elevation by said two laterally spaced members and said support arm means.

16. In an industrial truck as set forth in claim 15, means for tilting said carrier means.

17. In an industrial truck as set forth in claim 15, means for automatically tilting said carrier means and any cargo carried thereby upon the two laterally spaced members being raised a predetermined distance.

18. In an industrial truck having two longitudinally extending and laterally spaced members disposed in substantially the same horizontal plane, frame means having longitudinally extending and laterally spaced-apart support arm means connected to and carried by the two laterally spaced members, cargo carrier means journaled between said arm support means adapted to travel horizontally on substantially coplanar trackways, said carrier means comprising semicircular band portion means, drum shoe means connected to each of said semicircular band portion means adapted to swing laterally outwardly to an extended position for permitting admission of a cargo into contact with said semicircular band portion means when the truck approaches a relatively stationary cargo, and means carried by each of said support arm means for urging each of said drum shoe means inwardly into a cargo embracing position substantially arcuately coextensive with said semicircular band portion means when said carrier means are urged to a rearward position upon engagement with a cargo to thereby grasp the cargo for transport.

19. In an industrial truck as set forth in claim 18, means for tilting said carrier means for inverting the cargo.

20. In an industrial truck as set forth in claim 18, means for automatically tilting said carrier means and any cargo carried thereby upon vertical movement of laterally spaced members.

21. Apparatus for use with a fork lift truck for dumping a container comprising: lifting frame means having first and second parallelly extending and longitudinally projecting support arm means adapted to rest on forks of the fork lift truck for vertical movement, container carrier means for grasping and supporting the container disposed between said first and second support arm means and pivotally supported thereby in such a manner as to permit the same to be tilted about an axis transverse to said first and second support arm means, said carrier means carrying first and second drum shoe means, first and second elliptical camming surface means each having T-shaped trackways formed therein respectively connected to oppositely disposed portions of said first and second support arm means forwardly of said carrier means for providing bearing support and guide surfaces for said first and second drum shoe means, said first and second elliptical camming surface means respectively urging said first and second drum shoe means inwardly towards each other when said carrier means is urged against a relatively stationary container between said first and second support arm means with sufficient force to urge said carrier means rearwardly a predetermined distance relative to said support arm means until said drum shoe means retain the container in the embrace of said carrier means, said carrier means further including first and second semicircular band portion means, each of said semicircular band portion means of arcuate contour and together defining an arc of over 180 degrees, first and second support lug means respectively extending diametrically outwardly and laterally of said first and said second semicircular band portion means, each of said drum shoe means having laterally projecting coplanar camming lug means adapted to be respectively guided in a horizontal slot in said T-shaped trackway of each of said first and second support arm means, said first and second drum shoe means each having vertically upwardly and downwardly extending trackway follower pin means adapted to be respectively guided in grooves formed in the upper and lower ends of a vertical cross-arm portion of said T-shaped trackways of said first and second support arm means, first and second inverter means having coaxial pivot axes respectively journaled in said first and second support arm means, said first and second inverter means each having a slot formed therein for respectively receiving said first and second support lug means and when said carrier means has been urged to the rearwardmost position after encountering the container, means for tilting said first and second inverter means through an arc of approximately 190 degrees for inverting the container held by said carrier means, and said elliptical camming surface trackways and said lug receiving slot in each of said inverter means being coextensive and horizontal in the lug receiving position, means locking said support lug means in said slots of said inverter means when the inverter means are rotated, so that said first and second support lug means are respectively locked in said inverter slots when the same are tilted out of alignment with said horizontal slots of said T-shaped trackways of said elliptical camming surfaces, said container tilting means comprising a gear having teeth connected to each of said first and second inverter means, first and second arcuate sector gear means having teeth respectively meshing with said gear teeth of said first and second inverter means for driving the same, handle means fixed to said sector gear means and pivotally connected to each of said first and second support arm means, lever actuator means comprising flexible connecting means having one end connected to said lever means and having its other end adapted to be connected to a fixed portion of said truck between the forks of the truck for depressing said lever means when the forks of the truck are raised, the upward travel of the truck forks being limited by the length of said flexible connecting means, said inverter means being rotated and accordingly inverting the container during the upward travel of the truck forks and during the depressing of said lever means, and spring means urging said lever means into a raised position to upright said inverter means and the container when permitted by lowering the fork and slackening said flexible connector means.

22. Apparatus for use with a fork lift truck for dumping a container comprising: lifting frame means having first and second parallelly extending and longitudinally projecting support arm means adapted to rest on forks of the fork lift truck for vertical positioning, container carrier means for grasping and supporting a container disposed between said first and second support arm means and pivotally supported thereby in such a manner as to permit the same to be tilted about an axis transverse to said first and second support arm means, said carrier means carrying first and second drum shoe means, first and second elliptical camming surface means each having T-shaped trackways formed therein respectively connected to oppositely disposed portions of said first and second support arm means forwardly of said carrier means for providing bearing support and guide surfaces for said first and second drum shoe means, said first and second elliptical camming surface means respectively urging said first and second drum shoe means inwardly towards each other when said carrier means is urged against a relatively stationary container between said first and second support arm means with sufficient force to urge said carrier means rearwardly a predetermined distance relative to said support arm means until said drum shoe means retain the container in the embrace of said carrier means, said carrier means further including first and second semicircular band portion means, each of said semicircular band portion means being of arcuate contour and together defining an arc of over 180 degrees, first and second support lug means respectively extending diametrically outwardly and laterally of said first and second semicircular band portion means, each of said drum shoe means having laterally projecting coplanar camming lug means adapted to be respectively guided in a slot of each of said first and second support arm means, said first and second drum shoe means each having vertically upwardly and downwardly extending trackway follower guide pin means adapted to be respectively guided in grooves formed in the upper and lower ends of a vertical cross-arm portion of said T-shaped trackways of said first and second support arm means, first and second inverter means having coaxial pivot axes respectively journaled in said first and second support arm means, said first and second inverter means each having a slot formed therein for respectively receiving said first and second band support lug means when said carrier means has been urged to the rearwardmost position after encountering the container, means for tilting said first and second inverter means through an arc of approximately 190 degrees for inverting the container held by said carrier means, said container tilting means including a gear having teeth connected to each of said first and second inverter means, first and second arcuate sector gear means having teeth respectively meshing with said gear teeth of said first and second inverter means for driving the same, lever means fixed to said sector gear means and pivotally connected to each of said first and second support arm means, lever actuator means comprising flexible connecting means having one end connected to said lever means and having another end adapted to be connected to a fixed portion of said truck forks for depressing said lever means when the forks of the truck are raised, said inverter means being tilted and accordingly inverting the container during the upwardmost travel of the truck forks and the corresponding depression of the lever means, and spring means urging said lever means into a raised position to thereby upright said inverter means and the container when permitted by lowering the fork and slackening said flexible connector means.

23. An apparatus for use with a fork lift truck for dumping a container comprising, in combination: lifting frame means having first and second parallelly extending and longitudinally projecting support arm means adapted to rest on forks of the fork lift truck for vertical positioning relative to the truck, carrier means for grasping and supporting the container, said carrier means being disposed between said first and second support arm means and pivotally supported thereby in such a manner as to permit the same to be tilted about an axis transverse to said first and second support arm means, said carrier means carrying first and second drum shoe means, first and second camming surface means each having trackways formed therein in respectively oppositely disposed portions of said first and second support arm means forwardly of said carrier means for providing guide and support surfaces for said first and second drum shoe means, said first and second camming surface means respectively urging said first and second drum shoe means inwardly towards each other when said carrier means is urged against a relatively stationary container between said first and second support arm means with sufficient force to urge said carrier means rearwardly a predetermined distance relative to said support arm means until said drum shoe means retain the container in the embrace of said carrier means, said carrier means further including first and second semicircular band portion means, first and second support lug means respectively extending diametrically outwardly and laterally of said first and second semicircular band support means, each of said drum shoe means having laterally projecting coplanar camming lug means adapted to be respectively guided by said first and second support arm means, first and second inverter means having coaxial pivot axes respectively journaled in said first and second arm means, said first and second inverter means each having a slot formed therein for respectively receiving said first and second band support lug means when said carrier means have been urged to a predetermined position after encountering the container, means for tilting said first and second inverter means for inverting the container held by said carrier means, lever means pivotally connected to each of said first and second support arm means, lever actuator means comprising flexible connecting means connected to said lever means and adapted to be connected to a fixed portion of the fork lift truck for depressing said lever means when the forks of the truck are raised and tilting said inverter means and correspondingly inverting the container, and means urging said lever means into a raised position to thereby upright said carrier means and the container upon lowering of the fork.

24. Apparatus for transporting and dumping containers comprising: a lifting device including at least one support member, a sleeve bearing mounted in said support member, a pivotal shaft journaled in said sleeve bearing, means for pivoting said shaft in said sleeve bearing, and container carrier means carried by said support member and adapted to travel longitudinally thereof into and out of engagement with said pivotal shaft, said container carrier means upon engagement with the container and while moving into engagement with said pivotal shaft embracing the container, and upon said container carrier means moving out of engagement with said pivotal shaft releasing and freeing itself from the container.

25. Apparatus for transporting and dumping containers comprising: a lifting device including at least one support member, a sleeve bearing mounted in said support member, a pivotal shaft journaled in said sleeve bearing, means for pivoting said shaft in said sleeve bearing, container carrier means carried by said support member and adapted to travel longitudinally thereof into and out of engagement with said pivotal shaft, and mutually engaging camming means carried by said support member and said container carrier means operative to cause said container carrier means to respectively grip and release a container while the container carrier means moves into and out of engagement with said pivotable shaft.

26. Apparatus for dumping containers adapted to be positioned on a supporting device comprising: at least one support member; container carrier means carried by said support member and adapted to travel longitudinally therealong; and dumping means adjacent one end of the path of travel of said carrier means for engagement by said container carrier means including means for rotating the container carrier means to dump the container carried by it; said container carrier means operative upon engagement with the container and while moving into engagement with said dumping means to embrace the container, and said container carrier means operative on moving out of engagement with said dumping means to release and free itself from the container.

27. Apparatus for dumping containers adapted to be positioned on a supporting device comprising: at least one support member; container carrier means carried by said support member and adapted to travel longitudinally therealong; dumping means adjacent one end of the path of travel of said carrier means for engagement by said container carrier means including means for rotating the container carrier means to dump the container carried by it; and mutually inter-engaging camming means carried by said support member and said container carrier means operative to cause said container carrier means to respectively grip and release a container as the container carrier means moves toward and away from the point of engagement with said dumping means.

28. Apparatus for gripping and supporting containers for handling them comprising: support means including at least two spaced-apart arm members; a semi-circular band including at least two sections hinged together supported between said arm members; a hinged drum shoe at either end of said band; and mutually inter-engaging camming means carried by said arm members and said drum shoes operative to cause said drum shoes to grip and release a container as the band and drum shoes move relative to the arm members.

29. The apparatus of claim 28 in which said semicircular band is a split band and including means for biasing the arms of said band toward open position.

References Cited

UNITED STATES PATENTS

| | | | |
|---|---|---|---|
| 2,832,630 | 4/1958 | Sterling. | |
| 3,112,835 | 12/1963 | Gierhart | 214—313 |
| 3,206,052 | 9/1965 | Kennedy | 214—313 |
| 3,307,724 | 3/1967 | Miller | 214—620 X |
| 2,655,401 | 10/1953 | Kelso | 294—115 X |
| 3,319,991 | 5/1967 | Ratcliff | 294—82 |
| 947,902 | 2/1910 | Glise | 214—46.32 |
| 1,926,693 | 9/1933 | Walker | 214—46.28 X |

GERALD M. FORLENZA, Primary Examiner

G. F. ABRAHAM, Assistant Examiner

U.S. Cl. X.R.

214—620, 652, 653, 710; 294—110, 113